ns Cited 423/321 S
United States Patent [19]
Ishibashi et al.

[11] 4,207,303
[45] Jun. 10, 1980

[54] METHOD FOR PRODUCING PURE PHOSPHORIC ACID

[75] Inventors: Hiroaki Ishibashi; Shizuo Tanoue, both of Minamatashi, Japan

[73] Assignee: Chisso Corporation, Osaka, Japan

[21] Appl. No.: 935,766

[22] Filed: Aug. 22, 1978

[30] Foreign Application Priority Data

Aug. 29, 1977 [JP] Japan .................. 52/103380

[51] Int. Cl.$^2$ ............................................ C01B 25/22
[52] U.S. Cl. ................................................ 423/321 S
[58] Field of Search .................................... 423/321 S

[56] References Cited

FOREIGN PATENT DOCUMENTS

| | | | |
|---|---|---|---|
| 773270 | 1/1972 | Belgium | 423/321 S |
| 47-36155 | 9/1972 | Japan . | |
| 48-38555 | 11/1973 | Japan . | |
| 49-1400 | 1/1974 | Japan . | |

*Primary Examiner*—O. R. Vertiz
*Assistant Examiner*—Thomas W. Roy
*Attorney, Agent, or Firm*—Fred Philpitt

[57] ABSTRACT

A method for producing a pure phosphoric acid from a phosphoric acid obtained through a wet process, in a high purity comparable to that from the dry process phosphoric acid, in a simpler manner, at a cheaper cost and more effectively, is provided, which method resides, in one main aspect, in concentrating a phosphoric acid obtained through the wet process, up to a $P_2O_5$ content of 30% by weight or higher; treating the resulting phosphoric acid with diisopropylcarbinol to extract a pure phosphoric acid; and back-extracting the pure phosphoric acid in the resulting extract with water, and also resides, in another main aspect, in subjecting a wet process phosphoric acid, to either a step of partially neutralizing said acid with an alkali, ammonia or a salt thereof, followed by adding a water-soluble low boiling organic solvent to said acid, or a step of adding a water-soluble low boiling organic solvent to said phosphoric acid, followed by partially neutralizing with an alkali or ammonia or a salt thereof; separating the resulting precipitate; after distilling off said solvent, treating the resulting solution with an extracting agent comprising diisopropylcarbinol to extract a phosphoric acid; and back-extracting the resulting solution with water.

9 Claims, 2 Drawing Figures

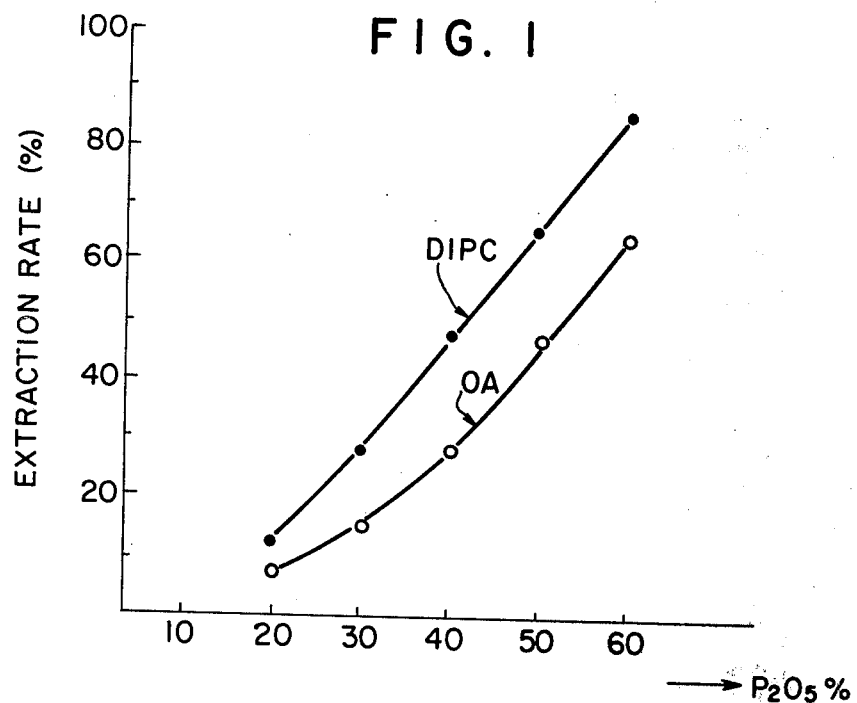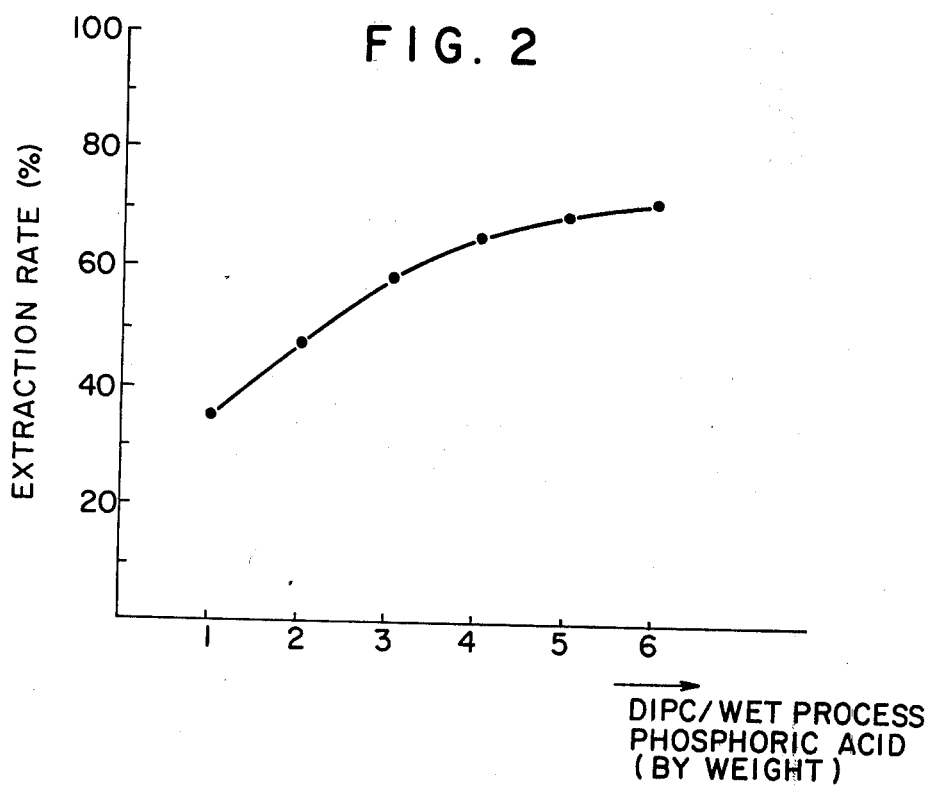

METHOD FOR PRODUCING PURE PHOSPHORIC ACID

DESCRIPTION OF THE INVENTION

The present invention relates to a method for producing an industrial pure phosphoric acid, and more particularly it relates to a method for producing an industrial pure phosphoric acid from a phosphoric acid according to the wet process (which will be abbreviated as a wet process phosphoric acid), by making use of solvent extraction.

A wet process phosphoric acid is produced by decomposing a rock phosphate by means of mineral acids such as sulfuric acid and contains a number of impurities such as Fe, F, Al, As, Cd, Ca, organic matters, etc. Its uses have been limited to raw materials for fertilizers, and it is the present status of art that a wet process phosphoric acid cannot be used as a so-called pure phosphoric acid for food-additives, drugs, metal surface treatment, etc. (which will be hereinafter referred to as pure phosphoric acid). A conventional method for producing pure phosphoric acid has been according to the dry process, and hence it has drawbacks in that a large amount of electric power is necessary for the production, and various apparatuses and steps are necessary for preventing environmental pollutions, e.g. for treating exhaust gases and waste products. In view of such a situation, various methods for producing a pure phosphoric acid from a wet process phosphoric acid, at a cheap cost, have been studied, but it is the present status that there have been found no satisfactory methods. Thus, production of a pure phosphoric acid from a set process phosphoric acid, as a raw material therefor, and its supply to the market have been desired.

According to the present invention, there is provided a method for producing a phosphoric acid solution of a high purity comparable to a dry process phosphoric acid, from a wet process phosphoric acid solution, which is now abundantly and easily available.

A number of methods have heretofore been proposed to produce a pure phosphoric acid according to a so-called solvent-extraction process, i.e. by extracting a wet process phosphoric acid, with an organic solvent which is hardly miscible with water. According to these methods, however, since a wet process phosphoric acid is separated in the form of liquid and liquid after being mixed with an organic solvent, i.e. into a liquid phase of pure phosphoric acid and a liquid phase of impure phosphoric acid, it is impossible to obtain a phosphoric acid having a quality acceptable as a pure phosphoric acid, although operation is simpler.

A first problem of the solvent extraction process consists in that there is no organic solvent which is superior in both of extraction rate and purity of the resulting pure phosphoric acid. As for the organic solvents employed for the extraction, there have heretofore been alcohols, amines, ketones, phosphoric acid esters, etc., but if a lower alcohol is employed, the extraction rate of phosphoric acid is good, but, on the other hand, the extraction rate of impurities is also good, and thus the purity of the resulting pure phosphoric acid is not good. Accordingly, if a lower alcohol such as butanol is employed, a further purification with an ion-exchange resin or the like is necessary. Since ion-exchange resins and equipments where they are used, are generally expensive, the cost of a pure phosphoric acid processed through such a purification process is also high. Further, a higher alcohol has had a drawback in that the separation of a phosphoric acid phase from a solvent phase is inferior and a longer separation time is necessary. Thus, depending upon organic solvents employed, there have been problems of extraction rate or inferiority of quality or operational problems such as separation time, etc.

A second problem consists in that the $P_2O_5$ concentration in a wet process phosphoric acid is usually in the range of 27~30%, and if it is employed as it is, the partition coefficient is low. Accordingly, for increasing the partition coefficient of a phosphoric acid into an organic solvent, it has been necessary to elevate the concentration of a wet process phosphoric acid. However, if concentrating a wet process phosphoric acid, it is necessary on account of the effect of impurities such as fluorine, etc., to employ anti-corrosive equipments, which results in a large expense for equipments and hence makes the cost of product higher. Thus, in the conventional process for producing pure phosphoric acid from a wet process phosphoric acid, it has become large technical problems to simplify the initial concentration step and to improve the partition coefficient in the organic solvent extraction.

An object of the present invention is to provide a method for producing a pure phosphoric acid of a better quality, from a wet process phosphoric acid as abovementioned. More particularly the object is to provide a novel method for extracting and purifying a wet process phosphoric acid. Another object is to provide an extraction method by using a novel and improved alcohol. A further object is to provide novel uses for said alcohols. A still further object is to provide a method for producing a phosphoric acid having a high purity with a good efficiency, without positively concentrating a wet process phosphoric acid and yet without passing through any purification step using an ion-exchange resin.

The present inventors have made strenuous studies and as a result have found a method for producing a pure phosphoric acid of a high purity from a wet process phosphoric acid, by means of a superior organic solvent (diisopropylcarbinol), which has never been employed therefor, and further a two-step extraction method wherein said solvent is employed in the latter step.

IN THE DRAWINGS

FIG. 1 shows the relationship between the phosphoric acid concentration in the extraction process of a wet process phosphoric acid with a higher alcohol and the extraction rate.

FIG. 2 shows the relationship between the amount of DIPC used and the extraction rate of phosphoric acid.

The present invention resides in:

(1) A method for producing a pure phosphoric acid which comprises
concentrating a phosphoric acid obtained by decomposing a rock phosphate with a mineral acid, to a $P_2O_5$ content of 30% by weight or higher;
treating the resulting phosphoric acid with diisopropylcarbinol to extract a pure phosphoric acid; and
back-extracting the pure phosphoric acid in the resulting extract with water.

(2) A method according to the above item (1) wherein said mineral acid for decomposition is sulfuric acid, nitric acid, hydrochloric acid, phosphoric acid or a mixture of the foregoing members.

(3) A method according to the above item (1) wherein the concentration of a wet process phosphoric acid is carried out by evaporation or by decomposition of a rock phosphate with a wet process phosphoric acid.

(4) A method according to the above item (1), wherein the treatment with diisopropylcarbinol is carried out batch-wise or in a continuous manner.

(5) A method according to the above item (1) wherein diisopropylcarbinol is used together with another organic solvent.

(6) A method according to the above item (1) wherein the diisopropylcarbinol formed by said back-extraction is reused for extracting a fresh wet process phosphoric acid.

(7) A phosphoric acid-extracting agent for a wet process phosphoric acid, containing diisopropylcarbinol as an effective component.

(8) A method for producing a pure phosphoric acid which comprises
concentrating a phosphoric acid obtained by decomposing a rock phosphate with a mineral acid, to a $P_2O_5$ content of $40 \sim 55\%$ by weight;
treating the resulting phosphoric acid with diisopropylcarbinol to extract pure phosphoric acid;
back-extracting the extract with water; and
treating the resulting back-extract with an activated carbon or an ion-exchange resin.

(9) A method for producing a pure phosphoric acid which comprises
concentrating a phosphoric acid obtained by decomposing a rock phosphate with a mineral acid, to a $P_2O_5$ content of 30% by weight or higher;
treating the resulting phosphoric acid with diisopropylcarbinol to extract pure phosphoric acid;
treating the resulting extract with a small amount of water or a phosphoric acid; and
back-extracting the resulting treated solution with water.

(10) A method according to the above item (9) wherein said small amount of water or phosphoric acid is used in the range of $1 \sim 30\%$ by weight based upon the content by weight of $P_2O_5$ in the extract to be treated.

(11) A method for producing a pure phosphoric acid from a wet process phosphoric acid, by two step extraction with organic solvents, which comprises:
subjecting a phosphoric acid obtained by decomposing a rock phosphate with a mineral acid, to either a step of partially neutralizing said phosphoric acid with an alkali or ammonia or a salt of the foregoing members, followed by adding a water-soluble low boiling organic solvent, or a step of adding a water-soluble low boiling organic solvent to said phosphoric acid, followed by partially neutralizing with an alkali or ammonia or a salt of the foregoing members,
separating the resulting precipitate,
distilling off said water-soluble low boiling organic solvent from the resulting separated solution,
treating the resulting solution formed after said distilling off, with an extracting agent comprising diisopropylcarbinol, to extract a phosphoric acid, and
back-extracting the resulting treated solution with water.

(12) A method according to the above item 11, wherein said alkali or ammonia or a salt of the foregoing members is sodium hydroxide, potassium hydroxide, ammonia, or sulfate, nitrate, halide or phosphate of sodium, potassium or ammonia; the molar ratio of the content of $P_2O_5$ in a starting wet process phosphoric acid, to the amount of said alkali or ammonia or a salt of the foregoing members used, is in the range of 1:0.05 to 1:0.4; and the temperature and time of said neutralization are in the range of $0° \sim 60°$ C. and in the range of $5 \sim 500$ minutes, respectively.

(13) A method according to the above items (11) or (12) wherein said phosphoric acid is treated, in advance, with hydroxide or a salt of calcium or barium (excluding sulfate thereof) to thereby remove calcium or barium sulfate.

(14) A method according to any one of the above items $11 \sim 13$, wherein said water-soluble low boiling organic solvent is selected from the group consisting of methanol, ethanol, isopropanol and acetone; the amount of said solvent used, based upon said phosphoric acid, is in the range of $10 \sim 1000\%$ by weight; and its addition temperature and time are in the range of $0° \sim 60°$ C. and in the range of $5 \sim 500$ minutes, respectively.

(15) A method according to any one of the above items $(11) \sim (14)$, wherein said precipitate is separated by a gravitational falling (sedimentation) or centrifugal separation, and said distilling off of said water-soluble low boiling organic solvent is carried out under a reduced pressure of 1 mmHg to a superatmospheric pressure of 2 $Kg/cm^2$ G.

(16) A method according to any one of the above items $(11) \sim (15)$ wherein said solution formed after said distilling-off is treated with said extracting agent comprising diisopropylcarbinol, as it is, or after concentrating said solution by evaporation.

(17) A method according to any one of the above items $(11) \sim (16)$ wherein the amount of said extracting agent comprising diisopropylcarbinol used, based upon said solution left after said distilling-off, is $10 \sim 1000\%$ by weight, and the temperature and time of the extraction with said extracting agent are in the range of $0° \sim 60°$ C. and in the range of $5 \sim 500$ minutes, respectively.

(18) A method according to any one of the above items $(11) \sim (17)$ wherein the amount of water used in said back-extraction is in the range of $5 \sim 100\%$ by weight based upon said extract solution, and the temperature and time of said back-extraction are in the range of $0° \sim 80°$ C. and in the range of $5 \sim 500$ minutes, respectively.

(19) A method according to the above item (11) wherein said extracting agent is diisopropylcarbinol.

(20) A method according to the above item (11), wherein said extracting agent consists of diisopropylcarbinol and 2-ethylhexanol.

Firstly the constituting elements for the above-mentioned methods of the items $(1) \sim (10)$ will be described below in detail.

It has been known in the known publications that usual $C_7$ alcohols such as n-heptanol can be employed as a solvent for purifying raw phosphoric acid, but it has not been known before this disclosure of the present invention that such an alcohol having a special structure as diisopropylcarbinol (which will be hereinafter abbreviated to DIPC) exhibits a much superior purification effectiveness as mentioned below. As for the concentration of phosphoric acid, the higher the concentration, the better the extraction rate with DIPC, and hence the higher concentration is desirable.

The relationship between the phosphoric acid concentration in the extraction process of a wet process phosphoric acid with a higher alcohol, and the extraction rate, is shown in FIG. 1. The extraction rate with DIPC is evidently much higher than that with 2-ethylhexanol. The reason why such a surprising fact has never been discovered is believed to be due to the presumption that DIPC has a special chemical structure, but has an extractive property to the same extent as those of n-heptyl alcohol (primary and secondary) or $C_7$ oxoalcohol. When DIPC is employed, the practical phosphoric concentration is preferably 30% by weight or higher in terms of $P_2O_5$, preferably 40~55% by weight. The reason of the preferable upper limit of 55% is due to the fact that a method for concentrating a wet process phosphoric acid up to the values higher than this value has not been known.

As for the ratio by volume of the amount of DIPC added to the phosphoric acid solution, the larger the amount of DIPC, the higher the extraction rate, but if the amount exceeds a certain value, the extraction rate does not increase, and hence the use of the solvent more than the required amount is not economical. Thus a ratio in the range of about 1:1~1:5 is preferable. The relationship between the amount of DIPC used in the extraction rate of phosphoric acid is shown in FIG. 2 (wherein the concentration of the wet process phosphoric acid is 50% by weight in terms of $P_2O_5$). For the extraction of phosphoric acid with DIPC, either of a batch process of mixer-settler type or a continuous process of counter flow-multistage type, etc. can be employed. Further as for the treating temperature and time, there is no particular limitation, but under the conditions of room temperature and from several minutes to several tens minutes as center, conditions of lower or higher temperatures and shorter or longer times can be also employed in the extraction, and it is possible to select conditions suitable to the apparatus employed or the atmospheric temperature.

According to the methods of the items (1)~(10), water is added to the DIPC phase obtained by extracting phosphoric acid, to back-extract phosphoric acid to thereby obtain pure phosphoric acid, as mentioned above, but if the DIPC phase prior to the back-extraction is, in advance, washed with a small amount of water, impurities such as heavy metals contained in a certain amount in the DIPC phase are transferred into the water phase whereby it is possible to improve the purity of pure phosphoric acid obtained by subsequent back-extraction. In this case, the more the amount of water used, the more improved the quality of pure phosphoric acid, but since phosphoric acid is transferred into water phase, too large an amount of addition of water is undesirable, thus the amount of water is preferably 10% by weight or less based upon the DIPC phase and 1%~30% by weight based upon $P_2O_5$. In this case, e.g. a pure phosphoric acid having a $P_2O_5$ content of 55% by weight or lower can be substituted for water.

The more the amount of water used for the back-extraction, the higher the back-extraction rate, but since the concentration of the resulting pure phosphoric acid is reduced, it is necessary to concentrate it after the extraction, which is, however, not economical, and hence an amount of 5%~20% by weight based upon the DIPC phase is desirable. The pure phosphoric acid obtained by the back-extraction is sometimes slightly colored. In such a case, it is decolorized with an active carbon, followed by concentration so as to give a desired concentration to obtain an aimed pure phosphoric acid. As for the active carbon employed, 0.5~1.0% by weight based upon $P_2O_5$ may be sufficient. For the back-extraction, either of a batch process or a continuous process of counter flow-multistage type may be employed as in the case of the extraction of phosphoric acid.

In the separation carried out after the extraction according to the above-mentioned methods of the items (1)~(10), a wet process phosphoric acid is mixed with DIPC to extract phosphoric acid, followed by allowing the resulting solution to stand to separate DIPC phase from water phase, whereas if a usual higher alcohol is substituted for DIPC, separation time is prolonged and workability is reduced perhaps on account of high viscosity. Thus the extraction with DIPC has a great advantage of making the separation time shorter, as compared with other alcohols of $C_7$ and $C_8$. The results where the separation times were compared are shown in Table 1.

Table 1

Separation time at the time of subjecting a wet process phosphoric acid to extraction with organic solvents

| | |
|---|---|
| Concentration of phosphoric acid according to the wet process ($P_2O_5$) | 47% |
| Amount of solvent (phosphoric acid: solvent) | 1:4 |
| Stirring at room temperature for 10 minutes | |

| Solvent | Separation time |
|---|---|
| 2-Ethylhexanol* | 90 min. |
| Heptanol** (on sale, according to oxo process) | 70 min. |
| DIPC | 5 min. |

*Viscosity, 9.8 C.P. (20° C.)
**3-Heptanol, 7.1 C.P. (20° C.)

Next, the constituting elements for the methods of the above-mentioned items (11)~(20) will be mentioned below in detail.

Firstly, ammonia, potassium hydroxide, sodium hydroxide, a potassium salt or a sodium salt as a neutralizing agent and a water-soluble organic solvent such as acetone, methanol, ethanol or the like, as an extracting agent, are added to a wet process phosphoric acid to precipitate impurities.

The resulting precipitate containing impurities can be removed by filtration. Since the resulting filtrate i.e. a solution having separated impurities consists of phosphoric acid and an organic solvent, this organic solvent is removed by distillation to give a phosphoric acid aqueous solution.

The more the amount of ammonia, sodium hydroxide, potassium hydroxide or the like added, based upon $P_2O_5$ contained in a wet process phosphoric acid, the higher the purity of the resulting phosphoric acid, but the yield of the resulting pure phosphoric acid in terms of $P_2O_5$ is reduced, and hence a too high amount thereof is undesirable. The ratio by weight of alkali: $P_2O_5$ is preferably in the range of 0.05:1 to 0.4:1, and particularly preferably in the range of 0.1:1 to 0.2:1. After the neutralization, when a water-soluble organic solvent such as acetone, methanol, ethanol, isopropanol, etc. is added, insoluble matters precipitate. The more the amount of the organic solvent added, the less the amount of impurities contained in the resulting phosphoric acid, i.e. the better the quality, but, on the other hand, the yield of phosphoric acid is reduced, and hence there is a problem of the balance between quality and yield. The ratio by volume of solvent to phosphoric acid is in the range of 2:1~10:1, preferably 3:1~7:1. The insoluble matters containing impurities, precipitated here, are ammonium phosphate in case where ammonia has been used as a neutralizing agent, and $P_2O_5$ contained therein is water-soluble or citric acid-soluble and hence usable as a fertilizer as it is. If a neutralizing agent is potassium hydroxide or a potassium salt, said insoluble matter is potassium phosphate which can be used as a fertilizer. In view of these facts, ammonia, potassium hydroxide and potassium sulfate are suitable, and among them, ammonia is most desirable due to its easiness of use. The filtrate obtained by separating insoluble matters by filtration is a phosphoric acid solution containing an organic solvent, and when this organic solvent is removed by means of distillation or the like, a phosphoric acid solution containing a smaller amount of impurities can be obtained. This phosphoric acid solution is slightly higher in the concentration than a wet process phosphoric acid used as a raw materials. This is due to a certain extent of concentrating which occurs at the time of azeotropic distillation of an organic solvent together with water.

According to the above-mentioned methods of the items (11)~(20), the phosphoric acid obtained according to the above-mentioned treatment with an organic solvent and an alkali is further subjected to an extraction with an extracting agent containing diisopropylcarbinol (which will be hereinafter abbreviated to a secondary extracting agent), to obtain a pure phosphoric acid having a very high purity. The concentration of the pure phosphoric acid obtained by the treatment with an organic solvent and an alkali is in the range of 28~32% by weight in terms of $P_2O_5$, and this acid can be extracted, as it is, with a secondary extracting agent, but in case where the concentration of the solution is low, since the extraction rate is reduced, it is desirable to concentrate the solution. As for desirable concentration attained through concentrating, the higher the better, but there is a limit to the possible concentration of phosphoric acid, and a range of about 43~62% by weight in terms of $P_2O_5$ is suitable, and a range of about 45~54% by weight is most suitable from the viewpoint of easiness in operation. In the solution obtained by this concentrating of phosphoric acid, the amount of impurities such as fluorine, etc. is very small as compared with that contained in the solution obtained by the concentrating of a wet process phosphoric acid for fertilizer. Thus, the material of apparatus is not corroded so much and the operation is also easy. As for the extraction with the secondary extracting agent, any of a continuous process of counter flow-multistage type, a batch process of mixer-settler type and the like processes can be employed. There is no particular limitation thereto. As for the amount of the secondary extracting agent to be added to an extracted solution of phosphoric acid, the more the amount, the higher the extraction rate, until the amount reaches a certain value, but when it exceeds the certain value, the extraction rate does not increase, and the use of an excessive amount of solvent than that required brings about no effectiveness. Thus, a ratio by weight in the range of about 1:1 to 1:5 (phosphoric acid: secondary extracting agent) is desirable.

The phosphoric acid transferred by extraction into the phase of secondary extracting agent is back-extracted with water. The more the amount of water used for the back-extraction, the higher the back-extraction rate, but since the concentration of the resulting pure phosphoric acid is reduced, it is necessary to concentrate the acid into a concentration required, after the back-extraction, and hence the use of a too much amount of water is not effective. Thus an amount in the range of 2~100%, particularly 5~20%, based upon the phase of secondary extracting agent, is desirable. As for treating apparatus, the same one as in the case of the above-mentioned extraction can be employed. There are no particular limitations to treating temperature and treating time, but the condition of 0°~80° C. and 5~500 minutes, and particularly the condition of from room temperature to 40° C. and 10~100 minutes, are preferable. If the pure phosphoric acid obtained by the back-extraction is colored, it is decolorized by an active carbon and concentrated to an aimed concentration to give a pure phosphoric acid product. As for the amount of active carbon used, 0.1~1.0% by weight based upon $P_2O_5$ may be sufficient. In the case of the back-extraction, too, either of a batch process or a continuous process of counter flow-multistage type can be employed as in the case of the above-mentioned extraction of phosphoric acid.

The wet process phosphoric acid employed in the method of the present invention has no particular limitation, and it is produced by decomposing a rock phosphate of Florida, Morocco, etc. with a mineral acid such as sulfuric acid, and it does not matter whether its color is brown or blue. As for the mineral acid used for the decomposition, a mineral acid such as nitric acid, hydrochloric acid and phosphoric acid can also be employed. As for the $P_2O_5$ concentration in a wet process phosphoric acid, the higher the more desirable, but the above mentioned methods of the items (11)~(20) have a large specific feature in that even a concentration of 27~30% by weight in terms of $P_2O_5$ can be also sufficiently employed. In case where the fluorine content in a wet process phosphoric acid is large, and if ammonia or its salt is employed as an alkali, it may be considered to remove the fluorine as a precipitate in the form of hardly soluble matter e.g. sodium silicofluoride, potassium silicofluoride, etc. by adding a sodium salt or a potassium salt to the acid, to thereby reduce the fluorine content. However, in the present invention, there is no particular problem on the fluorine content, but even if the content is high, it does not matter even if the phosphoric acid is employed as it is, and it is possible to obtain a pure phosphoric acid having a high purity, in the same operational manner as above mentioned.

Further, if sulfate ion is contained in a large amount in a raw material wet process phosphoric acid, it is desirable to remove the sulfate ion as a precipitate such as calcium sulfate, with a calcium salt or barium salt (excluding the sulfate salt), before DIPC, a water-soluble organic solvent, ammonia, etc. are added. For such a calcium salt, a rock phosphate is easiest to use and practical. Further, if a colored degree of a raw material wet process phosphoric acid is high, decolorization with an active carbon gives a pure phosphoric acid having a reduced color and a good quality. The amount of active carbon used is suitably in the range of about 0.3~1.5% by weight based $P_2O_5$.

However, in the treatment with DIPC, purification efficiency is so superior that pretreatment can be omitted if the presence of a trace of $SO_4$ in a pure phosphoric acid is not a problem so much. Such an omission is impossible in case where other extracting solvents are employed, and hence it is a great advantage of the methods of the above items (1)~(10). DIPC employed in the present invention has the following structural formula:

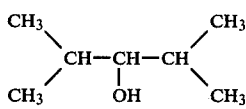

DIPC has been particularly prepared as a solvent for extracting the phosphoric acid of the present invention, by hydrogenating diisopropylketone (which will be hereinafter abbreviated to DIPK), and has a boiling point of 139° C./760 mmHg (52.9° C./20 mmHg), a specific gravity of 0.8297, a $\eta_D^{20}$ of 1.425, a viscosity (20° C.) of 6.97 cp and a solubility in water, of 0.78%. In addition, DIPK can be prepared from isobutyroaldehyde according to e.g. a method disclosed in Japanese patent publication No. 12/1975.

Next, the effectivenesses of the present invention separately mentioned above will be summarized as follows:

With regard to the effectivenesses of DIPC treatment described above in the items (1)-(10):

① The extraction yield of phosphoric acid is much higher than those of the extraction processes carried out with a known organic solvent (particularly, higher alcohols).

② The amount of various impurities contained in the extract product is extremely small.

③ By simultaneous use of a treatment carried out with water or a phosphoric acid after the extraction, the amount of the impurities contained in the product pure phosphoric acid is extremely reduced down to an extent comparable to that of a dry process phosphoric acid.

④ The separation time at the time of extraction is much shorter than those carried out with a known extracting agent. This is convenient for carrying out extraction step in a continuous process.

⑤ DIPC can be used at the same time with other extracting solvent or in admixture therewith.

⑥ If the extract product is colored, it can be easily decolorized by active carbon treatment.

Namely, it has been found as a result of the tests by using a number of alcohols carried out by the present inventors that DIPC is particularly superior to other alcohols, and its effectiveness is presumed to be due to the fact that DIPC is a compound having a symmetrical structure in right and left, and this has brought about good results for extracting phosphoric acid and removing and separating impurities.

With regard to the two stage extraction described in the above items (11)~(20):

⑦ In the treatment of a wet process phosphoric acid solution, with a low boiling organic solvent according to the two stage extraction, concentration of phosphoric acid solution is not necessary because the subsequent treatment with a secondary extracting agent is carried out.

⑧ According to the prior art, the solution obtained after the treatment with a low boiling organic solvent followed by distilling-off of the solvent, must have been purified with an ion-exchange resin, and also it has been necessary therefor to dilute the phosphoric acid solution prior to the treatment with the ion-exchange resin. Further since the concentration of pure phosphoric acid is usually 55% in terms of $P_2O_5$, a further concentration of the phosphoric acid is necessary after the treatment with the ion-exchange resin in case of conventional process. Since a once diluted phosphoric acid is again concentrated in such a prior art process, a loss due to the increase of step, and the increase of costs in the increase of initial investment, regeneration of ion-exchange resin, etc. are inevitable. Thus such a process could have not been said to be a commercially advantageous one. Whereas according to the methods of the above items (11)~(20), such a treatment with ion-exchange resin is unnecessary. This is also due to the fact that the treatment with a secondary extracting agent in place of said resin treatment is very effective for improving the purity of pure phosphoric acid aimed.

⑨ The method of extraction with a secondary extracting agent is simpler in the points of apparatus and operation than the above-mentioned method which uses an ion-exchange resin, and yet there is hardly any loss of the secondary extracting agent, and hence it is possible to obtain phosphoric acid having a high purity, with a high efficiency. This is due to a specific property of the secondary extracting agent of the present invention i.e. the fact that the agent has a larger capability of extracting a phosphoric acid than those of other water-insoluble organic extracting agents and the phase separation after mixing is faster.

⑩ It is possible to carry out the partial neutralization with an alkali or the like, at the same time with or independently of the treatment with a low boiling organic solvent. This is due to the fact that the treatment with an alkali or the like is a special treatment which makes the subsequent treatment with a secondary extracting agent, effective.

⑪ The amount of impurities contained in the product pure phosphoric acid is extremely small. Particularly since the amounts of Pb, Cd, As, etc. are very small, the product is also usable as a raw material for food additives, etc.

As mentioned above, the methods of the items (11)~(20) make it possible to obtain a pure phosphoric acid, without concentrating the wet process phosphoric acid which is produced for fertilizers, having a concentration of 27~30% in terms of $P_2O_5$, and without resorting to an ion-exchange resin. Thus they are simpler as a commercial process and very advantageous in the point of apparatus, and yet the quality of the resulting product is comparable to that of a dry process phosphoric acid. Thus these methods are epoch-making as a production method and the quality of product as compared with conventional methods.

The present invention will be mentioned in more detail by way of Examples and Reference examples. In these examples, "part" and "%" both are by weight.

EXAMPLE 1

150 Parts of a rock phosphate are added to 4000 parts of a dark-brown wet process phosphoric acid containing 27.5% of $P_2O_5$ and impurities (Fe 0.7%, CaO 0.24%, $SO_4$ 3.4%, Cl 0.05%, F 1.8%, Cd 0.001% and As 0.0007%), and the resulting mixture is stirred for 30 minutes and filtered. The resulting filtrate, a phosphoric acid solution is concentrated into 47% in terms of $P_2O_5$, and to 2440 parts of the resulting concentrate are added 2000 parts of DIPC, followed by stirring at room temperature for 5 minutes to transfer phosphoric acid by extraction into DIPC phase. The solution, after allowed to stand, is separated into DIPC phase and water phase (A). The separation time was 5 minutes. 250 Parts of water are added to the DIPC phase, followed by stirring at room temperature for 5 minutes to back-extract the phosphoric acid into the water phase. DIPC left after the extraction is further reused for extracting phosphoric acid from the above-mentioned water phase (A), and the resulting DIPC phase obtained by this reextraction is back-extracted with water. In such a manner, 5-stage extractions including 4 times reextractions are carried out, and water phases obtained by the back-extraction are collected, and 1% of active carbon powder based on $P_2O_5$ is added, followed by stirring at room temperature for 30 minutes and then filtration. The filtrate phosphoric acid solution is concentrated into 54% in terms of $P_2O_5$ to give 1426 parts. The conversion into a pure phosphoric acid based on $P_2O_5$ was 70%. The resulting pure phosphoric acid was colorless and transparent and had the following analytical values, and also was extremely small in the amount of impurities so that it had as high a purity as unexpectable from a pure phosphoric acid obtained according to a conventional purification carried out through extraction with an organic solvent.

Analytical values of pure phosphoric acid

| | |
|---|---|
| $P_2O_5$ | 54% |
| $SO_4$ | 0.009% |
| Ca | 0.0009% |
| Fe | 0.0008% |
| F | 0.005% |
| Cl | 0.0008% |
| Pb | 0.0007% |
| Cd | 0.0001% |

EXAMPLE 2

Phosphoric acid was extracted employing the same wet process phosphoric acid and in the same manner as in Example 1 by using DIPC. Namely, extraction was carried out with 2000 parts of DIPC and after the extraction the resulting DIPC phase was washed with 100 parts of 45% in terms of $P_2O_5$, of a pure phosphoric acid. The resulting DIPC phase after the washing was then subjected to back-extraction as in Example 1 to give a pure phosphoric acid. The yield was 1380 parts, and the acid had a $P_2O_5$ content of 54%, i.e. the conversion into pure phosphoric acid was 68%. The analytical values of impurities were as follows and to an extent comparable to those of a pure phosphoric acid obtained according to a dry process.

Analytical values of impurities contained in the pure phosphoric acid

| | |
|---|---|
| $SO_4$ | 0.0008% |
| Ca | 0.0003% |
| Fe | 0.0001% |
| F | 0.0007% |
| Cl | 0.0002% |
| Pb | 0.0002% |
| Cd | 0.0000% |

REFERENTIAL EXAMPLE 1

A pure phosphoric acid was produced employing 2-ethylhexanol (so-called octanol, which will be hereinafter abbreviated to OA) most usually employed as a high purity alcohol for extracting a phosphoric acid, and in the same manner as in Example 1. Namely, 150 parts of a rock phosphate were added to 4000 parts of the same dark brown wet process phosphoric acid as the above-mentioned, having a $P_2O_5$ content of 27.5%, followed by stirring at 70° C. for 30 minutes and then filtration. The resulting filtrate, phosphoric acid solution was concentrated up to a $P_2O_5$ content of 47%, followed by adding 2000 parts of OA and stirring at room temperature for 5 minutes to transfer phosphoric acid by extraction into an OA phase. The solution, after allowed to stand, was separated into an OA phase and a water phase. The time required for the separation was 40 minutes which was longer than the time in case of DIPC, thus a problem is remaining in this case in the point of operation efficiency. To the separated OA phase were added 250 parts of water, followed by stirring at room temperature for 10 minutes to back-extract phosphoric acid into water phase. The resulting OA phase left after the back-extraction was reused for the next extraction as in Example 1 to give 1120 parts of a pure phosphoric acid having a $P_2O_5$ content of 54% (conversion: 55%). The resulting pure phosphoric acid had a slightly green color and its analytical values were as follows. Namely the acid had a larger content of impurities than those of Examples 1 and 2 and was much inferior in the quality to them.

Analytical values of impurities contained in the pure phosphoric acid

| | |
|---|---|
| $SO_4$ | 0.08% |
| Ca | 0.07% |
| Fe | 0.05% |
| Cl | 0.04% |
| Pb | 0.03% |
| Cd | 0.001% |

REFERENTIAL EXAMPLE 2

The pure phosphoric acid prior to concentrating into a product having a $P_2O_5$ content of 54% was passed through a strongly acidic cation exchange resin and a strongly basic anion exchange resin to remove impurities, followed by concentration up to a $P_2O_5$ content of 54%. Its analytical values are shown in the next table. Namely, the same extent of quality as that of the pure phosphoric acid of the present invention which was not subjected to any ion exchange resin treatment, cannot be obtained only after an ion exchange resin treatment by using the same ion exchange resin as in Example 2. Such a process, however, is more expensive in the points of initial investment for ion exchange resin, consumption of the resin, etc. Whereas, according to the production method with DIPC of the present invention, it is possible to obtain a pure phosphoric acid in a lower cost and in a higher purity.

Analytical values of impurities contained in the pure phosphoric acid were as follows:

| | |
|---|---|
| SO$_4$ | 0.001% |
| Ca | 0.004% |
| Fe | 0.0007% |
| F | 0.0009% |
| Cl | 0.0003% |
| Pb | 0.0005% |
| Ca | 0.0000% |

EXAMPLE 3

370 Parts of a Florida rock phosphate were added to 7560 parts of a black-brown wet process phosphoric acid, for fertilizers, having a P$_2$O$_5$ concentration of 27% and containing impurities of Fe 0.8%, CaO 0.26%, SO$_4$ 3.2%, Cl 0.03%, F 1.7%, Cd 0.02% and As 0.008%, followed by stirring at 65° C. for one hour and then filtration. To the resulting filtrate phosphoric acid solution were added 14 parts of an active carbon to decolorize the solution. To the resulting decolorized solution were added 75 parts of ammonia gas to partially neutralize it, followed by adding 11500 parts of acetone to give a precipitate which was then separated by filtration. Almost all of the impurities were transferred into the precipitate. The resulting filtrate was a purified phosphoric acid containing acetone. This acetone was distilled off from the phosphoric acid. The resulting phosphoric acid left after the distilling-off was concentrated under reduced pressure on heating, up to a P$_2$O$_5$ content of 50%, followed by adding 8280 parts of DIPC, and stirring at room temperature for 10 minutes in an extractor of mixer-settler type to transfer the phosphoric acid by extraction into a DIPC phase. The thus treated material was separated into a DIPC phase and a water phase. The time required for the separation was 5 minutes. To the separated DIPC phase were added 1240 parts of water, followed by stirring at room temperature for 5 minutes to back-extract a phosphoric acid into a water phase. To the resulting water phase obtained by the back-extraction was added 1% based on P$_2$O$_5$ of an active carbon, followed by stirring for 30 minutes and then filtration. The resulting filtrate phosphoric acid solution was concentrated up to a P$_2$O$_5$ content of 50% to give 1840 parts of a pure phosphoric acid. The analytical values of impurities contained in this pure phosphoric acid were as follows:

| | |
|---|---|
| SO$_4$ | 0.0008% |
| Ca | 0.0002% |
| Fe | 0.0002% |
| F | 0.0008% |
| Cl | 0.0001% |
| Pb | 0.0002% |
| Cd | 0.00007% |
| As | 0.00009% |

EXAMPLE 4

360 Parts of a Florida rock phosphate were added to 7560 parts of the same wet process phosphoric acid as in Example 3, followed by stirring at 65° C. for 30 minutes and then filtration. Ten parts of an active carbon were added to the resulting filtrate, phosphoric acid solution to decolorize it. 100 Parts of ammonia gas were added to the resulting phosphoric acid to partially neutralize it, followed by adding 1300 parts of ethanol to form a precipitate which was separated by filtration. Almost all of the impurities were transferred into the precipitate, while the above-mentioned filtrate contained a purified phosphoric acid containing ethanol. This ethanol contained in the phosphoric acid was removed by distilling-off, and the resulting ethanol was further reused for the subsequent purification. The phosphoric acid having been freed of ethanol was concentrated up to a P$_2$O$_5$ content of 50%, followed by adding 8000 parts of DIPC, stirring at room temperature for 5 minutes and extraction. 1000 Parts of water were added to the resulting separated DIPC phase to back-extract phosphoric acid into water phase, to which 1% of an active carbon based on P$_2$O$_5$ was added, followed by stirring for 30 minutes and then filtration. The resulting filtrate phosphoric acid solution was concentrated up to a P$_2$O$_5$ content of 54% to give 1700 parts of a pure phosphoric acid.

The analytical values of this pure phosphoric acid were as follows:

| | |
|---|---|
| SO$_4$ | 0.0013% |
| Ca | 0.0003% |
| Fe | 0.0007% |
| F | 0.0011% |
| Cl | 0.0003% |
| Pb | 0.0001% |
| Cd | 0.00003% |
| As | 0.00009% |

EXAMPLE 5

Example 4 was repeated except that 8100 parts of 2-ethylhexanol were substituted for DIPC, to give 1730 parts of a pure phosphoric acid. The analytical values of impurities contained therein were as follows:

| | |
|---|---|
| SO$_4$ | 0.0015% |
| Ca | 0.0008% |
| Fe | 0.0009% |
| F | 0.0009% |
| Cl | 0.0010% |
| Pb | 0.0004% |
| Cd | 0.00009% |
| As | 0.00011% |

EXAMPLE 6

Example 3 was repeated except that a mixture of 3400 parts of DIPC with 4900 parts of 2-ethylhexanol was substituted for DIPC, to give 1830 parts of a pure phosphoric acid. The analytical values of impurities of this acid were as follows:

| | |
|---|---|
| SO$_4$ | 0.0010% |
| Ca | 0.0004% |
| Fe | 0.0006% |
| F | 0.0009% |
| Cl | 0.0004% |
| Pb | 0.0003% |
| Cd | 0.00010% |
| As | 0.0009% |

REFERENTIAL EXAMPLE 3

230 Parts of a Florida rock phosphate (P$_2$O$_5$: 34%) were added to 4730 parts of a wet process phosphoric acid for fertilizer (P$_2$O$_5$: 27.5%, SO$_4$: 2.4%), followed by stirring at 65° C. for 1.5 hour to remove sulfuric acid, subjecting the resulting precipitate to centrifugal separation and filtration, and concentrating the resulting phosphoric acid solution up to a $P_2O_5$ content of 40%. Into the resulting concentrate was blown 0.21 mol (43 parts) per mol of $P_2O_5$, of ammonia gas, to partially neutralize the concentrate. Acetone was then added to the resulting neutralized phosphoric acid solution in 4 times the amount by volume of the solution to form a precipitate, which was separated by filtration. Impurities were transferred into the precipitate, and the resulting filtrate was a purified phosphoric acid containing acetone (extracted phosphoric acid). This acetone contained therein was removed by distilling-off, and the resulting distilled-off acetone can be further reused.

The resulting phosphoric acid solution after distilling-off of acetone was diluted with water to a $P_2O_5$ content of 10%, followed by passing through a strongly acidic cationic ion exchange resin, and further concentrating up to a $P_2O_5$ content of 54%, to give 1740 parts of a pure phosphoric acid. The analytical values of impurities contained therein were as follows:

| | | |
|---|---|---|
| | $SO_4$ | 0.01% |
| | Ca | 0.003% |
| | Fe | 0.001% |
| | F | 0.009% |
| | Cl | 0.03% |
| | Pb | 0.0023% |
| | Cd | 0.0032% |

What is claimed is:

1. A method for producing a pure phosphoric acid from a wet process phosphoric acid by two step extraction with organic solvents, which comprises:
   (a) subjecting phosphoric acid obtained according to the wet process to either
     (1) a step consisting of partly neutralizing said phosphoric acid with one member selected from the group consisting of sodium hydroxide, potassium hydroxide, ammonia, or sulfate, nitrate, halide or phosphate of sodium, potassium, and ammonia, and adding a water-soluble low boiling organic solvent to the resulting material, or
     (2) a step consisting of adding a water-soluble low boiling organic solvent to said phosphoric acid and partly neutralizing the resulting material with one member selected from the group consisting of sodium hydroxide, potassium hydroxide, ammonia, or sulfate, nitrate, halide or phosphate or sodium, potassium and ammonia,
   (b) the molar ratio of the content of $P_2O_5$ in the starting wet process phosphoric acid to the amount of said alkali or ammonia or a salt of the foregoing members used, being in the range of 1:0.05 to 1:0.4; and the temperature and time of said neutralization being in the range of 0°–60° C. and of 5–500 minutes, respectively;
   (c) separating the resulting precipitate,
   (d) distilling off said water-soluble low boiling organic solvent from the resulting separated solution,
   (e) treating the resulting solution, formed by said distilling off, with an extracting agent comprising diisopropylcarbinol, to extract the phosphoric acid, and
   (f) back-extracting the resulting treated solution with water.

2. A method according to claim 1 wherein said phosphoric acid is treated, in advance, with hydroxide or a salt (other than sulfate) of calcium or barium to thereby remove calcium or barium sulfate.

3. A method according to claim 1 wherein said water-soluble low boiling organic solvent is selected from the group consisting of methanol, ethanol, isopropanol and acetone; the amount of said solvent used, based upon said phosphoric acid, being in the range of 10–1000% by weight; and its addition temperature and time being in the range of 0°–60° C. and 5–500 minutes, respectively.

4. A method according to claim 1 wherein said precipitate is separated by a sedimentation or centrifugation and said distilling off of said water-soluble low boiling organic solvent is carried out under from a subatmospheric pressure of 1 mmHg to a superatmospheric pressure of 2 $Kg/cm^2$ G.

5. A method according to claim 1 wherein said solution left after said distilling-off is treated with said extracting agent comprising diisopropylcarbinol, without evaporating the water contained in said solution in advance or after evaporating it in advance.

6. A method according to claim 1 wherein the amount of said extracting agent comprising diisopropylcarbonol used, based upon said solution left after said distilling-off, is 10–1000% by weight, and the temperature and time of the extraction with said extracting agent are in the range of 0°–60° C. and 5–500 minutes, respectively.

7. A method according to claim 1 wherein the amount of water used in said back-extraction is in the range of 5–100% by weight based upon said extract solution, and the temperature and time of said back-extraction are in the range of 0°–80° C. and 5–500 minutes, respectively.

8. A method according to claim 1 wherein said extracting agent is diisopropylcarbinol.

9. A method according to claim 1 wherein said extracting agent consists of diisopropylcarbinol and 2-ethylhexanol.

* * * * *